United States Patent
Wang et al.

(10) Patent No.: US 7,069,171 B2
(45) Date of Patent: Jun. 27, 2006

(54) EMI NOISE FILTER FOR EDDY CURRENT TURBO SPEED SENSOR

(75) Inventors: Yue Yun Wang, Columbus, IN (US); Charles Wu, Indianapolis, IN (US); Thomas A. Dollmeyer, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 325 days.

(21) Appl. No.: 10/616,262

(22) Filed: Jul. 9, 2003

(65) Prior Publication Data
US 2005/0050878 A1    Mar. 10, 2005

(51) Int. Cl.
*G06F 15/00* (2006.01)

(52) U.S. Cl. ...................... 702/145; 702/142

(58) Field of Classification Search ................. 702/38, 702/145, 193, 195, 142
See application file for complete search history.

(56) References Cited

U.S. PATENT DOCUMENTS

| | | | |
|---|---|---|---|
| 3,732,493 A | 5/1973 | Pelkey | |
| 4,439,728 A * | 3/1984 | Rickman, Jr. | 324/164 |
| 4,475,493 A | 10/1984 | Masteller et al. | |
| 4,594,668 A | 6/1986 | Fujawa et al. | |
| 4,604,701 A | 8/1986 | Fujawa et al. | |
| 4,874,245 A | 10/1989 | Spillman, Jr. et al. | |
| 5,206,816 A | 4/1993 | Hill et al. | |
| 6,208,134 B1 | 3/2001 | Demma | |
| 6,298,728 B1 * | 10/2001 | Fekete et al. | 73/660 |
| 6,384,594 B1 | 5/2002 | Uehara et al. | |
| 6,408,834 B1 * | 6/2002 | Brackney et al. | 123/568.21 |
| 2002/0047683 A1 | 4/2002 | Kawashima | |

* cited by examiner

*Primary Examiner*—John Barlow
*Assistant Examiner*—Douglas N. Washburn
(74) *Attorney, Agent, or Firm*—Barnes & ThornburgLLP

(57) ABSTRACT

A turbocharger speed controller includes a rising rate limiter having an input receiving a turbocharger speed signal and an output producing a rate limited turbocharger speed signal, a high envelope filter having an input receiving the rate limited turbocharger speed signal and an output producing a filtered and rate limited turbocharger speed signal, a turbocharger speed control signal generator having an input receiving the filtered and rate limited turbocharger speed signal and an output producing a turbocharger speed control signal based on comparison of the filtered and rate limited turbocharger speed signal with a desired turbocharger speed, and a swallowing capacity control mechanism responsive to the turbocharger speed control signal to vary a swallowing capacity of the turbocharger.

19 Claims, 9 Drawing Sheets

EMI NOISE FILTER FOR EDDY CURRENT TURBO SPEED SENSOR

FIELD OF THE INVENTION

The present invention relates generally to speed sensors for turbochargers of turbocharged engines and more particularly to a filter to eliminate EMI noise from Eddy current turbo speed sensor readings for turbocharger governor control.

BACKGROUND OF THE INVENTION

It has become common practice to increase engine performance by turbocharging the engine. Among the various types of turbochargers are variable geometry turbochargers (VGT) wherein the swallowing capacity of the turbine is regulated by a governor to control the overpressure to fuel intake manifold. For a VGT controlled engine, it is critical to protect its turbocharger from over speeding. If the turbo speed is too high and exceeds its design limit, it may damage the turbocharger due to the over stress. In order to protect the turbocharger from over speeding, it is common practice to monitor the turbine, compressor or shaft angular velocity, i.e. the turbo speed.

Turbo speed sensors provide feed back to governors that regulate the swallowing capacity of the turbocharger. Certain turbo speed sensors are susceptible to electromagnetic (or radio frequency) interference (EMI). Vehicles typically include devices that generate EMI. EMI may contribute to less than optimal control of the turbo speed.

SUMMARY OF THE INVENTION

To prevent high turbo speed in a turbo charged engine subjected to electromagnetic interference, this invention develops a digital filter, which effectively removes EMI noise from an eddy-current turbo speed signal. A digital filter for a turbine geometry controller ("TGC") governor for a variable geometry turbocharger ("VGT") having a design limit on its turbo speed and having its turbo speed sensed by an eddy current sensor in accordance with the present disclosure uses a digital filter to filter the output of a turbo speed sensor providing feedback to the governor that regulates the turbo speed below its design limit. The filter includes a rate limiter stage and a high envelope filter stage. The rate limiter stage removes or significantly reduces the high spike noise from the turbo speed signal. The envelope filter stage removes high frequency oscillation noise from the turbo speed signal. The rate limiter stage may include a first rate limiter and a second rate limiter filter. The envelope filter tracks the upper edge of the turbo speed signal to remove oscillation noise. Preferably, envelope filter stage does not introduce a phase delay when the turbo speed accelerates. Envelope filter stage may include a nonlinear envelope filter. Alternatively, envelope filter stage may include a linear envelope filter. The combined EMI noise filter is effective to remove or substantially reduce the total EMI noise.

These and other objects of the present invention will become more apparent from the following description of the illustrative embodiments.

DESCRIPTION OF THE ILLUSTRATIVE EMBODIMENTS

Figure 1:
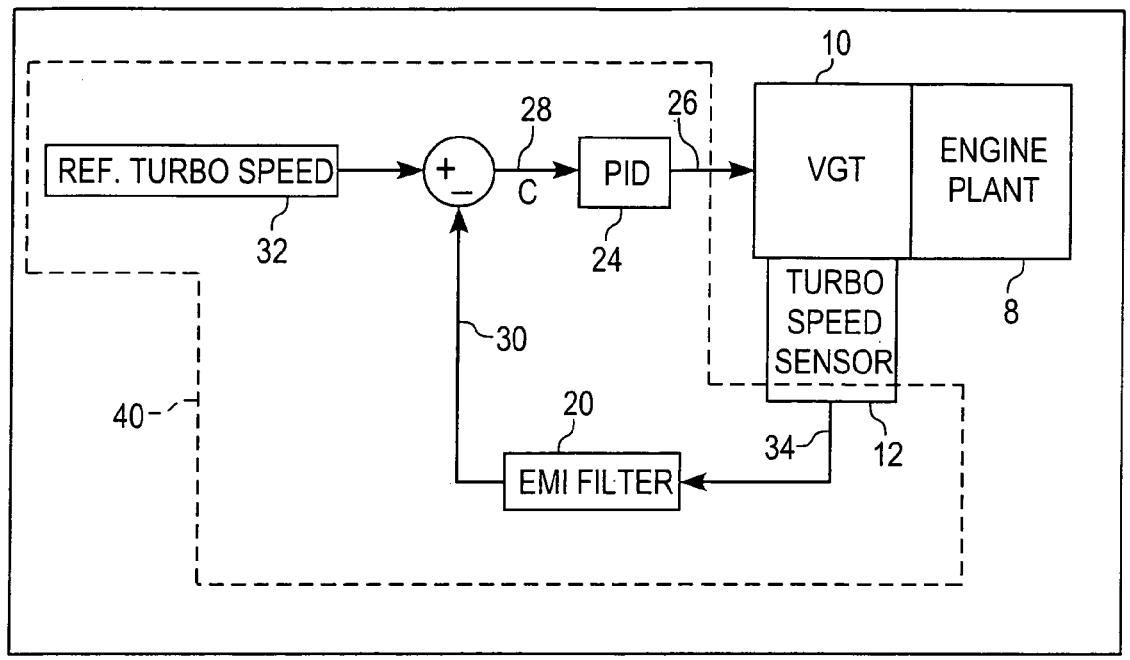
FIG. 1 is a block diagram of a turbine geometry controller governor showing an engine plant having its performance enhanced by a variable geometry turbocharger controlled by a proportional integral derivative controller receiving an error signal indicating the difference between a reference turbo speed and the actual turbo speed sensed by a turbo speed sensor.

For the purposes of promoting an understanding of the principles of the invention, reference will now be made to a number of illustrative embodiments shown in the drawings and specific language will be used to describe the same. It will nevertheless be understood that no limitation of the scope of the invention is thereby intended.

While the invention described herein is disclosed in an automotive environment wherein the performance of an engine plant 8 is enhanced by a variable geometry turbocharger 10 that has its turbo speed sensed by an eddy current sensor 12, those skilled in the art will recognize that the teaching of this disclosure are applicable to other turbochargers and turbo-machines that require speed regulation and to other turbo speed sensors that have outputs which can be adversely affected by EMI.

As shown, for example, in FIG. 1, filtered turbo speed sensor 12 senses the turbo speed of turbocharger 10 boosting the intake manifold pressure of engine plant 8. A proportional integral derivative ("PID") controller 24 provides a control signal 26 to turbocharger 10 based on the error 28 between the filtered turbo speed signal Y(k) 30 and a reference turbo speed signal 32. In FIG. 1, turbocharger 10 is a variable geometry turbocharger such as a Holset HY55 variable geometry turbocharger (VGT). The variable geometry of the Holset turbocharger 10 allows rapid changes in boost pressure to maximize and control the boost pressure over a wide range of engine operating speeds. The Holset HY55 uses an axially sliding ring nozzle that varies the velocity of the exhaust gasses entering the turbine housing 14 to alter the geometry of turbocharger 10 to allow for a wide range of boost while controlling turbocharger shaft speed. This reduces turbo lag and improves power, fuel economy and noise levels. Thus, in the disclosed embodiment, control signal 26 controls the position of an actuator for the sliding ring nozzle.

Other VGT turbochargers 10 use pivoted vanes 18 to form a variable nozzle turbine (VNT). In such turbochargers 10, control signal 26 would control vane position actuators. As used herein, the term variable geometry turbocharger 10 includes all turbocharger configurations in which the swallowing capacity of a turbocharger 10 is regulated. Those skilled in the art will recognize that the swallowing capacity of turbochargers 10 can also be controlled using waste gates and exhaust throttles. In such turbocharger configurations, control signal 26 would control the position of actuators for the waste gates and exhaust throttles. The device 20 disclosed herein is applicable to any turbocharger controller wherein turbo speed is controlled using turbo speed as a feedback parameter.

Figure 2:
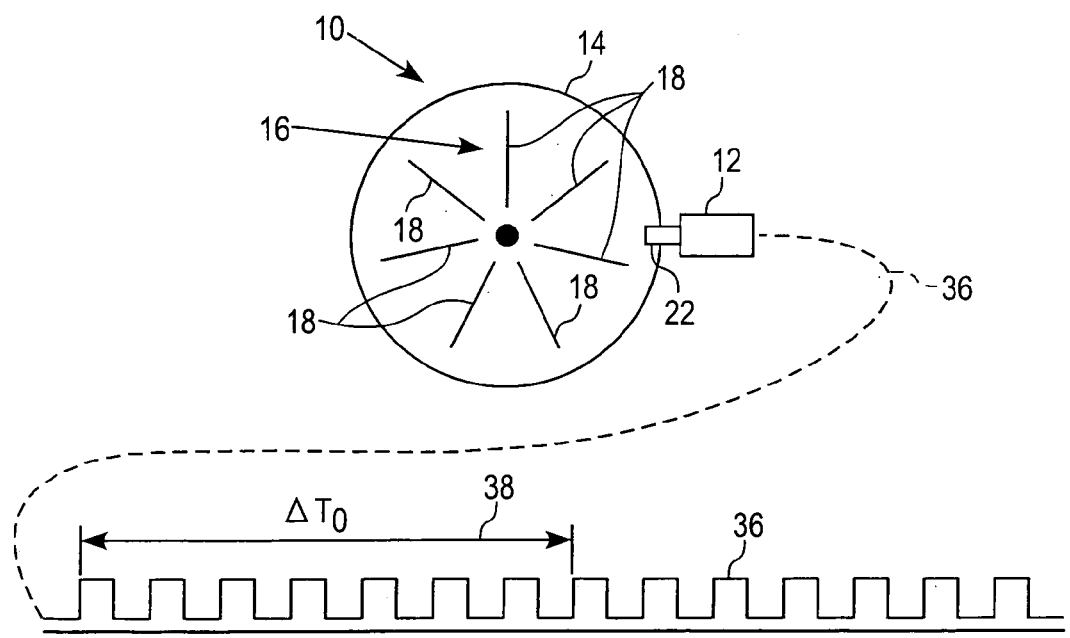
FIG. 2 shows a diagrammatic view of a cross-section of the variable geometry turbo charger showing seven compressor blades enclosed in a turbo housing through which the probe of an eddy current sensor passes to provide a digital turbo speed signal.

As shown in FIGS. 1 and 2, engine plant 8 is turbocharged using Variable Geometry Turbocharger 10 that has its speed sensed by eddy current sensor 12. Eddy current sensors 12 are generally less expensive than other turbo speed sensors, such as a variable reluctant (VR) type sensor. Additionally, eddy current turbo speed sensors 12 do not require a water-cooled bearing housing for turbocharger 10 as do VR sensors. Unfortunately, the output of eddy current turbo sensors 12 is susceptible to EMI. The disclosed device 20 and method filter EMI from the raw turbo speed signal U(k) 34 to provide a filtered turbo speed signal 30 that permits more reliable control of turbo speed.

Referring to FIG. 2 the hardware set-up to measure the turbo speed by an eddy current sensor 12 is shown. In the illustrated embodiment, the turbine of compressor 16 has seven blades or vanes 18. Sensor 12 is installed on the turbo housing 14 with its probe 22 close to blades 18. Illustratively, sensor 12 is an eddy current sensor. Probe 22 of sensor 12 has an excitation coil, which induces an eddy current whenever a blade 18 passes sensor probe 22. This eddy current is then detected or transformed into a pulse signal 36, see FIG. 2. The delta time $T_0$ 38 between every seven passing blades 18 is captured by an electronic control module (ECM) 40, which counts one revolution of the turbo shaft. The instantaneous turbo speed or raw turbo speed signal U(k) 34 is calculated as the inverse of this delta time $T_0$ 38, see Eqn. (1).

$$TurboSpeed = \frac{1}{\Delta T_0}(\text{rps}) = \frac{1}{60*\Delta T_0}(\text{rpm}) \quad (1)$$

Due to its presence in an automobile, eddy current sensor 12 may be subjected to electromagnetic interference (EMI). The EMI could be generated by a radio station, a closely tail gated vehicle with its own antenna or by an antenna in the vehicle in which the sensor 12 is installed. Other sources of EMI are also present in vehicles.

The IEEE has set up a common standard for testing the robustness of eddy current sensors 12 subjected to EMI. The standard tests the robustness of eddy current sensor 12 against EMI at a 0.6 seconds step and 100 Volts/meter radio wave field. The inventors tested their turbo speed sensor 12 against this requirement prior to implementation of the disclosed filter 20. A typical result is shown in FIG. 3.

Figure 3:
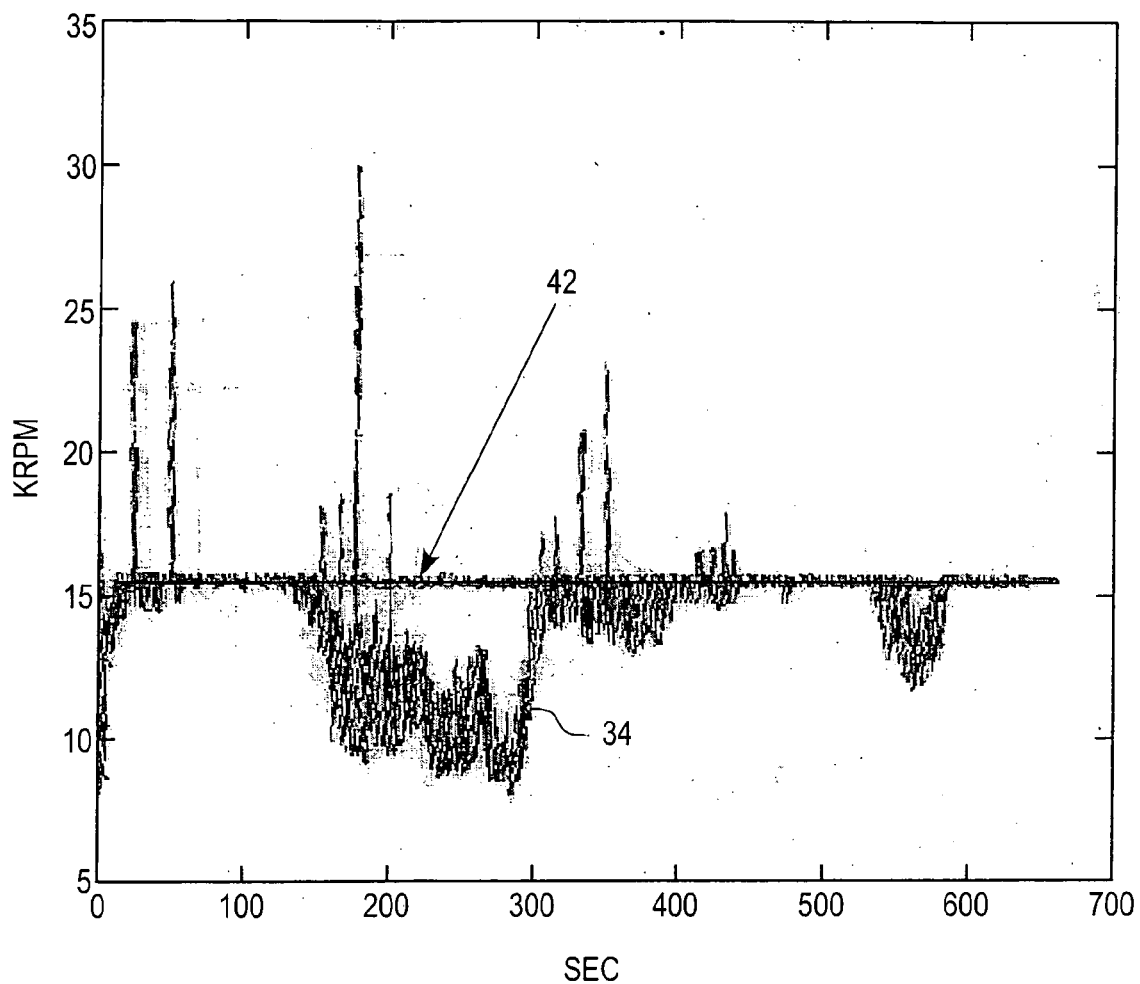
FIG. 3 is a plot of the actual turbo speed an the turbo speed indicated by an eddy current sensor subjected to EMI in accordance with the set by the IEEE showing high spikes and noise caused by the EMI.

FIG. 3 indicates that the actual turbo speed 42 increased within the first few second from 0 RPM to 16000 RPM and remained substantially constant for the next ten minutes. The measured raw turbo speed U(k) 34 with EMI created a wave form, the upper edge of which generally followed actual turbo speed 42, however, the EMI noise created both high spikes and high frequency noise. If the spikes are high enough to exceed the turbo speed limit, they will unnecessarily activate the TGC governor. On the other hand, if the turbo speed hits the design limit, the high frequency noise may also cause the turbocharger 10 to oscillate. These problems have negative impact on the performance. The device 20 disclosed herein is designed to eliminate or substantially reduce both the high spikes and the high frequency noise in the raw turbo speed signal U(k) 34 output by a turbo speed sensor 12 subjected to EMI.

The disclosed device 20 substantially filters out the EMI component of the measured raw turbo speed signal U(k) 34. When filtering out EMI components, it is preferable to eliminate or significantly reduce the high spikes in the measured raw turbo speed signal U(k) 34, remove high frequency noise from the measured raw turbo speed signal U(k) 34, avoid the introduction of phase delay to the filtered turbo speed signal Y(k) 30 when the turbo speed accelerates and minimize phase delay in the filtered turbo speed signal Y(k) 30 when the turbo speed decelerates. Those skilled in the art will recognize that an EMI filter 20 in accordance with the teachings of this disclosure will meet one or more of the above defined guidelines but may not necessarily meet all of the guidelines.

The disclosed EMI filter 20 was designed to meet all of the above mentioned guidelines. The disclosed EMI filter 20 cascades two individual filter stages and a core first order filter 44 commonly used with eddy current sensors 12. The filter stages include a rising rate limiter stage 46 and a high envelope filter stage 48, 148. Illustratively, the rising rate limiter stage 46 includes a first rising rate limiter 50 and a second rising rate limiter 52.

Rising rate limiter stage 46 removes or substantially reduces the high spikes induced by EMI in the raw turbo speed signal U(k) 34 output by the eddy current sensor 12. The algorithm for rising rate limiter stage 46 is defined as follows:

If (U(k)−U(k−1))>Rate_Limit_Threshold $S_1(k)=U(k-1)+$Rate_Limit_Value

Else $S_1(k)=U(k)$

If $(S_1(k)-S_1(k-1))>$Rate_Limit_Threshold $S_2(k)=S_1(k-1)+$Rate_Limit_Value

Else $S_2(k)=S_1(k)$

End.

Where U(k) is the value of the current raw turbo speed signal 34, $S_1(k)$ is the output signal 54 of first stage rising rate limiter and $S_2(k)$ is the output signal 56 of second rising rate limiter 52. As is common practice in discrete-time systems, U(k−1) is the value of the raw turbo speed signal sensed at the previous sample time and $S_1(k−1)$ is the value of the output signal of first stage rising rate limiter 50 sensed at the previous sample time. As shown in the Simulink® model of first rising rate limiter 50 in FIG. 7, a shift register or time-delay element 58 stores the value U(k−1) for use in subsequent iterations of the model. In implementing first and second rising rate limiters 50, 52, respectively, an upper bound is placed upon the permitted increase in turbo-speed. This upper bound is called the rate limit threshold 60.

In other words, if the difference between the current raw or unfiltered turbo speed U(k) 34 and the previous raw or unfiltered turbo speed U(k−1) exceeds rate limit threshold 60, then the output signal $S_1(k)$ 54 of first rising rate limiter 50 is restricted to the previous raw or unfiltered turbo speed U(k−1) plus an acceptable increase. This acceptable increase is defined as the rate limit value 62. If the difference between the current raw or unfiltered turbo speed U(k) 34 and the previous raw or unfiltered turbo speed U(k−1) does not exceed rate limit threshold 60, then the output signal $S_1(k)$ 54 of first rising rate limiter 50 is the current raw or unfiltered turbo speed U(k) 34. The design of second rising rate limiter 52 is the same as that of first rising rate limiter 50 except that the input to the second rising rate limiter 52 is the output $S_1(k)$ 54 of first rising rate limiter 50 instead of the raw or unfiltered turbo speed signal U(k) 34.

Based on testing of the illustrative Holset HY-55 turbocharger 10, the fastest acceleration of the turbo speed can not exceed 1500 rpm/10 ms. Thus, if the value of the turbo speed signal is sensed every ten milliseconds and the difference between consecutive values exceeds 1500 rpm, then the turbo signal must include a spike caused by EMI as turbocharger 10 physically prohibits increases of this amount. Thus, in the illustrated device 20, rate limit threshold 60 is set to 1500 RPM. At a 10 ms sample rate, if the change of the turbo speed (U(k)−U(k−1)) is larger than rate limit threshold 60, the algorithm will limit the output $S_1(k)$ 54 of first rising rate limiter 50 to the previous input U(k−1) plus rate limit value 62. Rate limit value 62 is calibrated to achieve the desired results. In the disclosed device 20, rate limit value 62 may assume any selected value between 0 and 1500 RPM. In the disclosed embodiment, rate limit value 62 is illustratively selected to be 1000 RPM. If the change (U(k)−U(k−1) is less than rate limit threshold 60, the output $S_1(k)$ 54 equals current input U(k) 34.

Those skilled in the art will recognize that rate limit threshold 60 and rate limit value 62 need not be constants but may be variables determined by other operating parameters of turbocharger 10 or engine plant 8 within the scope of the disclosure. For instance, rate limit threshold 60 may be a function of the difference between a design speed limitation on turbocharger 10 and the previous turbo speed multiplied by the change in exhaust manifold pressure or throttle position. Other parameters may be used to determine the value of rate limit threshold 60 and rate limit value 62 within the scope of the disclosure.

Passing through the first rising rate limiter 50, the raw turbo speed U(k) 34 is rate limited to produce an output signal $S_1(k)$ 54. To make sure no higher spike remains, second rising rate limiter 52 is applied to $S_1(k)$ 54. The output $S_2(k)$ 56 of second rising rate limiter 52, and in the illustrated embodiment the rising rate limiter stage 46, is free of high spikes. Rising rate limiter stage 46 only removes high spikes and is thus different from a traditional rate limiter that typically limits the increase and decrease of a signal within bounds. Although the rising rate limiter stage 46 only removes high spikes, it is able to track a step response signal with only two step sample time delay.

In the illustrated embodiment, after being rate limited, a filtered version of output $S_2(k)$ 56 of rising rate limiter stage 46 is filtered by high envelope filter stage 48, 148 to further remove the high frequency EMI noise. Before discussing the two illustrated embodiments of high envelope filter stage 48, 148, it is beneficial to study the characteristics of the high frequency EMI noise.

Figure 8:
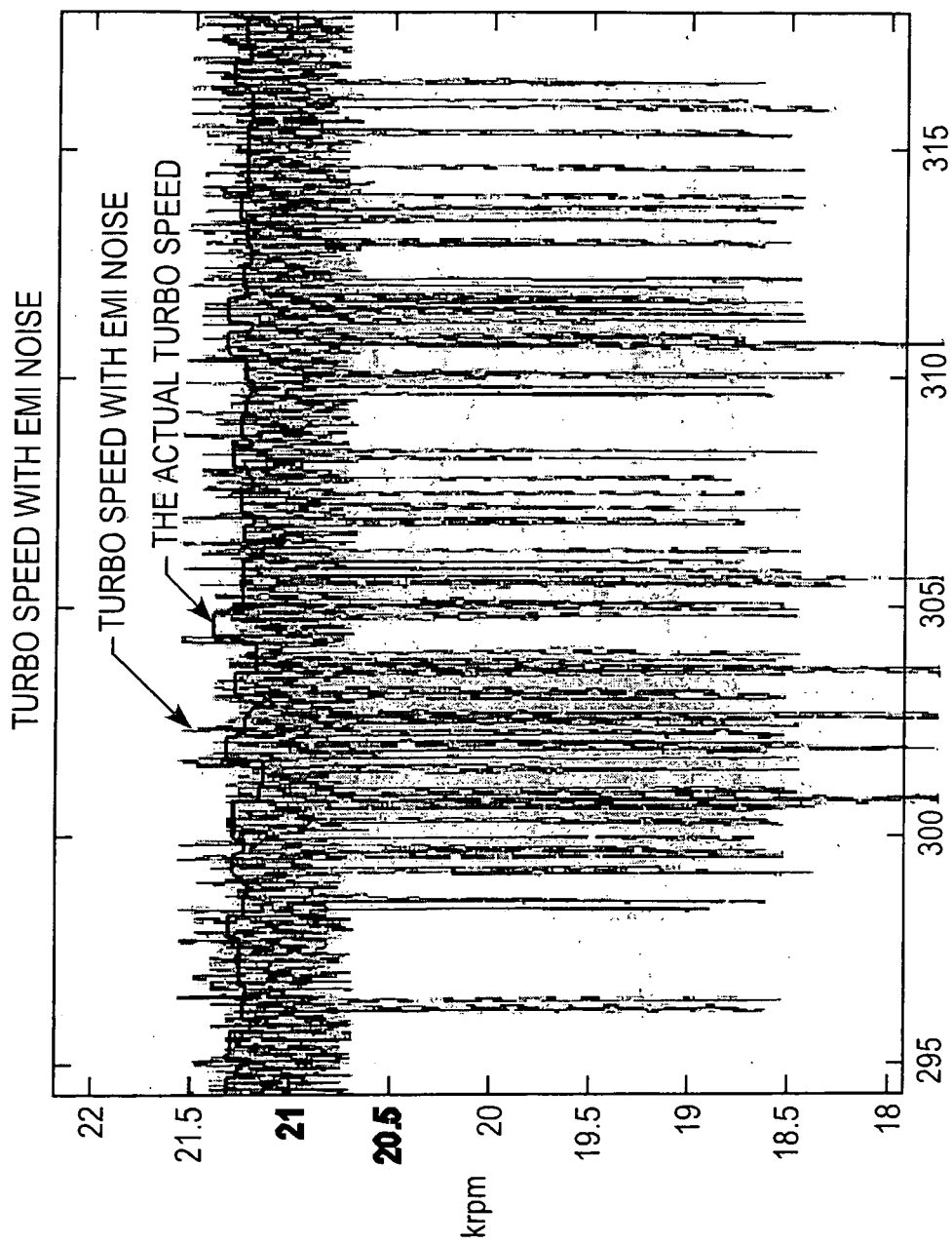
FIG. 8 is a plot of the output of the rising rate limiter stage of a turbo speed sensor subjected to EMI showing the elimination of high spikes.

FIG. 8 shows a plot of the actual turbo speed 42 and a rising rate limited turbo speed signal $S_2(k)$ 56 contaminated by EMI noise but missing the high spikes. It can be seen from the plot that the actual turbo speed 42 follows the upper edge of the rising rate limited turbo speed signal $S_2(k)$ 56 contaminated by EMI noise. Hence, if a filter is able to track the upper edge of the rising rate limited turbo speed signal $S_2(k)$ 56, it will remove the high frequency EMI noise. A high envelope filter 48, 148 meets this requirement.

The total EMI filter 20 combines the rising rate limiter stage 46 with the high envelope filter stage 48, 148. The net effect is to remove the high spikes and the high frequency noise from the raw turbo speed signal U(k) 34 to produce a filtered turbo speed signal Y(k) 30. The Simulink® model illustrated in FIG. 4 implements the EMI filter 20.

The input to filter 20 is the raw or unfiltered turbo speed U(k) 34. After passing the rising rate limiter stage 46, a rising rate limited turbo speed signal $S_2(k)$ 56 is provided. Without the presence of the EMI noise, rising rate limited turbo speed signal $S_2(k)$ 56 is identical to raw or unfiltered turbo speed U(k) 34. If raw or unfiltered turbo speed U(k) 34 was contaminated with EMI, rising rate limiter stage 46 removes or reduces high spikes from raw or unfiltered turbo speed U(k) 34 to generate rising rate limited turbo speed signal $S_2(k)$ 56. Rising rate limited turbo speed signal $S_2(k)$ 56 output by the rising rate limiter stage 46 is then filtered by a core first order filter 44, originally required by the turbo speed processing. The output of the core first order filter 44 is a filtered rate limited turbo speed signal X(k) 64. Without the EMI presence, this filtered rate limited turbo speed signal X(k) 64 becomes the filtered turbo speed signal Y(k) 30. Otherwise, envelope filter 48, 148 will further remove the high frequency noise from filtered rate limited turbo speed signal X(k) 64 to produce filtered turbo speed signal Y(k) 30.

Figure 4:
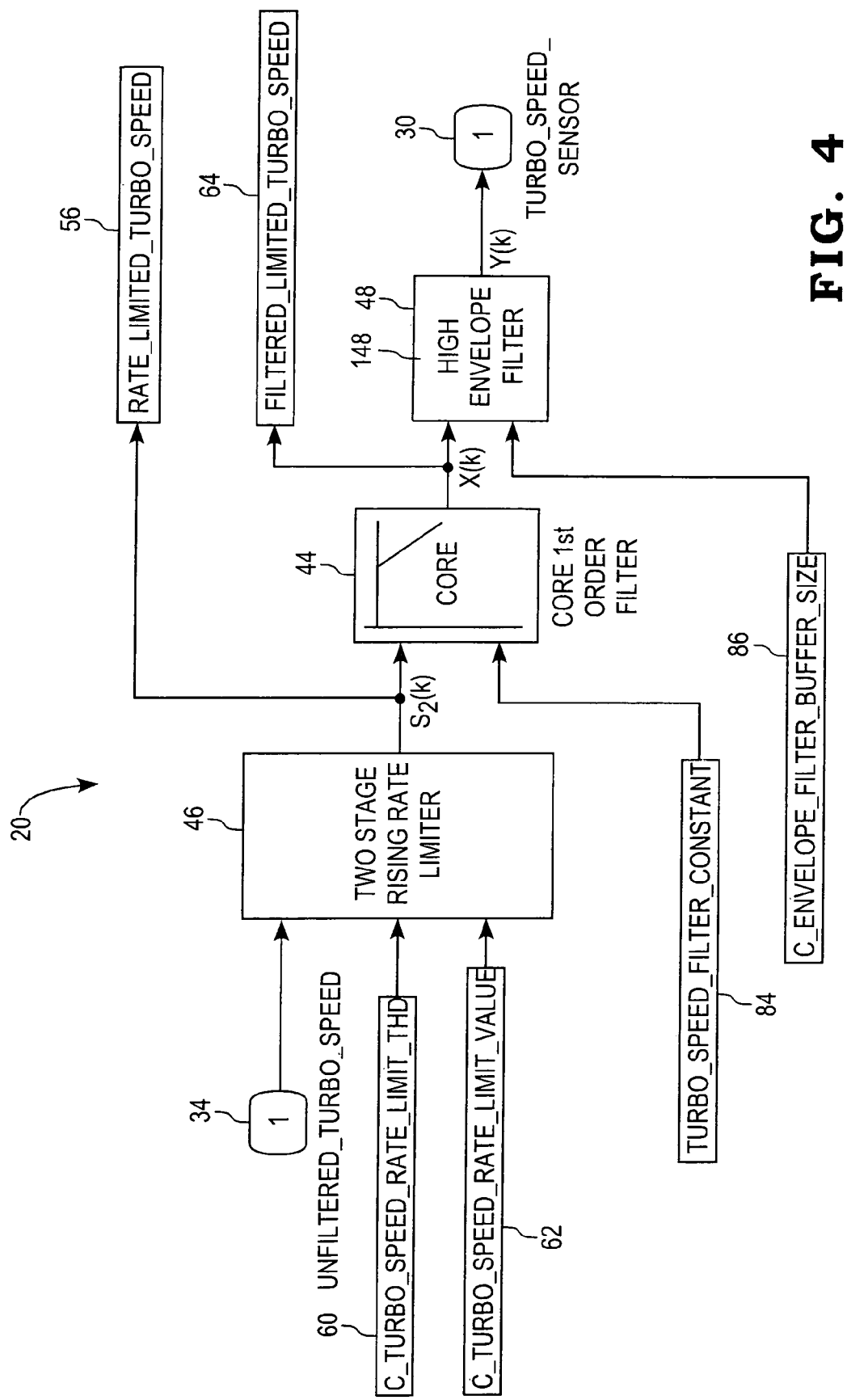
FIG. 4 is a Simulink® model of the turbo speed filter of the present disclosure and a core first order filter commonly used to filter turbo speed signals showing a rising rate limiter stage of the disclosed filter processing the unfiltered turbo speed signal before it enters the core filter and a high envelope filter stage of the disclosed filter processing the filtered limited turbo speed signal output by the core filter.
Figure 5:
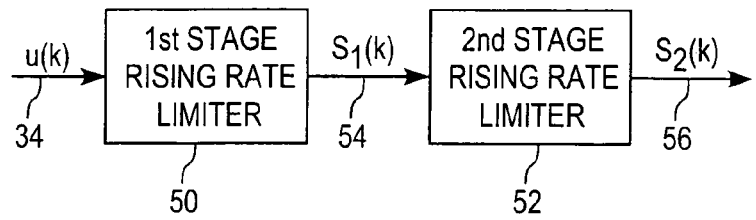
FIG. 5 is a block diagram of the rising rate limiter stage of FIG. 4 showing a first rising rate limiter and a second rising rate limiter.
Figure 6:
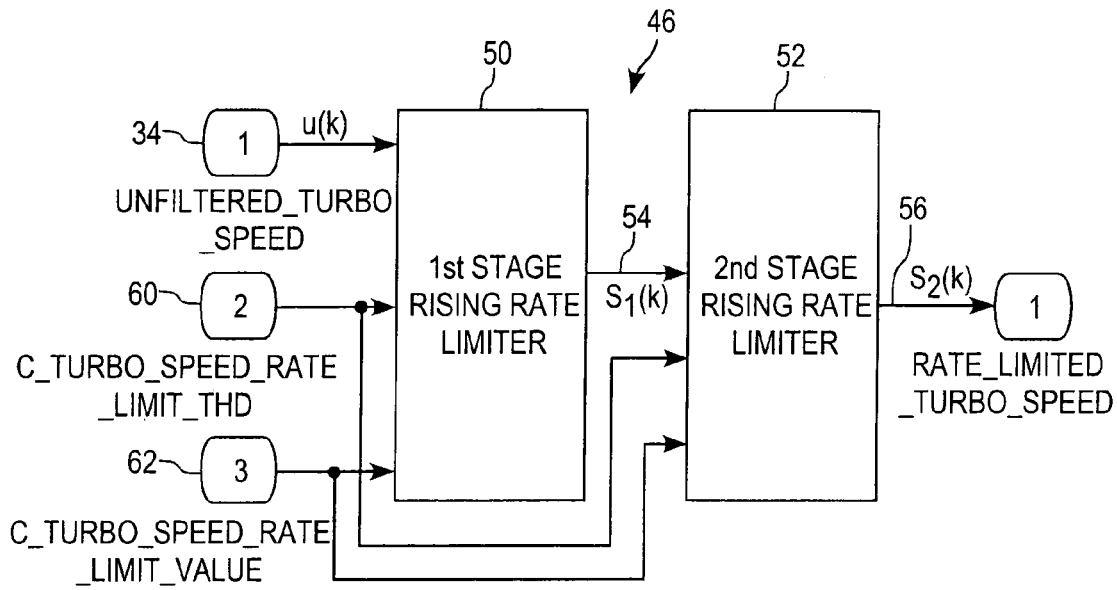
FIG. 6 is a Simulink® model of the rising rate limiter stage of FIG. 4 showing cascaded first and second stage rising rate limiters.
Figure 7:
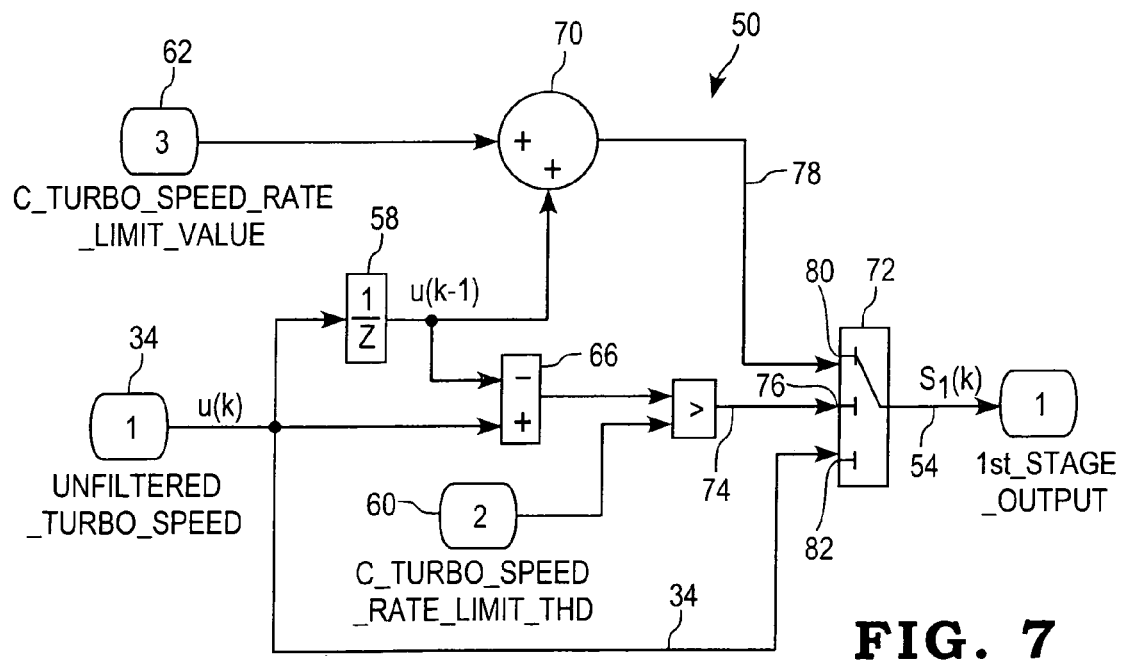
FIG. 7 is a Simulink® subsystem model of the first stage rising rate limiter of FIG. 6.

Referring to FIGS. 6 and 7, software diagrams are shown which implement rising rate limiter stage 46. As shown, for example, in FIG. 6, both the first rising rate limiter 50 and second rising rate limiter 52 receive the stored value of rate limit threshold (C_Turbo_Rate_Limit_Thd) 60 and rate limit value (C_Turbo_Rate_Limit_Value) 62. Additionally, first rising rate limiter 50 receives the unfiltered current turbo speed value U(k) 34 as an input. First rising rate limiter 50 outputs a rate limited value of the turbo speed $S_1(k)$ 54 which acts as an input to second rising rate limiter 52. Second rising rate limiter 52 outputs a rate limited turbo speed $S_2(k)$ 56, which, as shown in FIG. 4, acts as an input to core first order filter 44 required by the governor.

As shown in FIG. 7, the Simulink® model of first rising rate limiter 50 includes a Sum block 66, a Unit delay block 58, a relational operator block 68, a summation block 70 and a Switch block 72. Sum block 66 receives the unfiltered current value of the turbo speed U(k) 34 as an input to the first rising rate limiter 50. Unfiltered turbo speed signal U(k) 34 also acts as an input to Unit Delay block 58 from the discrete Block Library of Simulink® and as an input signal to second data input 82 of Switch block 72 from the Linear Block Library of Simulink®. Sum Block 66 is configured to subtract the output (U(k−1)) of Unit Delay block 58 from unfiltered turbo speed U(k) 34 to output the difference of U(k)−U(k−1). The output of Sum block 66 and rate limit threshold 60 are inputs to Relational Operator block 68 from the Nonlinear Block Library of Simulink®. Relational Operator block 68 is configured to output a digital high signal if the value output by Sum Block 66 is greater than rate limit threshold 60 and output a digital low signal, i.e. zero, otherwise. The output of Relational Operator block 68 acts as the control signal 74 to control input 76 of Switch block 72.

The output (U(k−1)) of Unit Delay block 58 acts as an input to summation block 70. Summation block 70 receives rate limit value 62 as a second input. Summation block 70 outputs the sum (U(k−1)+rate limit value) 78 of the prior unfiltered turbo speed and rate limit value 62.

Output (U(k−1)+rate limit value) 78 of summation block 70 acts as the first data input 80 of Switch block 72. Switch block 72 selects between the value received at first data input 80 and the value received at second data input 82 based upon the value received at control input 76. The conditions under which Switch block 72 passes first data input 80 is selected with the "Criteria for passing first input" parameter in the drop down parameter box of Switch block 72 in Simulink. Switch block 72 can be configured to selectively check whether control input 76 is greater than or equal to a threshold value, purely greater than the threshold value, or nonzero. If the control input 76 meets the condition set in the criteria for passing first input parameter, then the first data input 80 is passed. Otherwise, the second data input 82 is passed. In the illustrated embodiment, the criteria for passing first input parameter is set to nonzero as a high signal is sent by relational operator block 68 when U(k)−U(k−1)>rate limit threshold, indicating that the output $S_1(k)$ 54 of Switch block 72 should be the prior value of raw turbo speed signal plus rate limit value (U(k−1)+rate limit value) which is present on first data input 80.

As shown more particularly in FIG. 7 the output $S_1(k)$ 54 of first rising rate limiter 50 is selected from two data input values 80, 82 based upon the value of the control input 76. In the illustrated embodiment, Switch block 72 outputs the input on first data input 80 (U(k−1)+rate limit value) if second or control input receives a digital high control signal 74 on control input 76, i.e. if (U(k)−U(k−1))>rate limit threshold, then S1(k)=(U(k−1)+rate limit value). If Switch block 72 receives a digital low control signal 74 on control input 76 then the output of Switch block 72 is the unfiltered turbo speed U(k) 34, i.e. else S1(k)=U(k).

Thus, the algorithm of first rising rate limiter 50 is:
If (U(k)−U(k−1))>Rate_Limit_Threshold $S_1(k)$=U(k−1)+Rate_Limit_Value Else $S_1(k)$=U(k)

Those skilled in the art will recognize that the Simulink® model of the second rising rate limiter 52 is virtually identical to that shown in FIG. 7 except that the output $S_1(k)$ 54 of first rising rate limiter 50 replaces the unfiltered turbo speed U(k) 34 as an input to second rising rate limiter 52. Thus, the algorithm of second rising rate limiter 52 is:
If $(S_1(k)−S_1(k−1))$>Rate_Limit_Threshold $S_2(k)=S_1(k−1)$+Rate_Limit_Value Else $S_2(k)=S_1(k)$ Those skilled in the art will recognize that the rate limiters 50, 52 could also be modeled using the rate limiter 52 from the Nonlinear block library of Simulink® if the turbo speed rate limit threshold 60 and the turbo speed rate limit value 62 are set to the same value.

As shown, for example in FIG. 4, the output $S_2(k)$ 56 of rising rate limiter stage 46 acts as an input to core first order filter 44. Core first order filter 44 also receives a turbo speed filter constant 84 as an input. Core first order filter 44 outputs a filtered limited turbo speed signal X(k) 64 that acts as an input to high envelope filter stage 48, 148.

Figure 9:
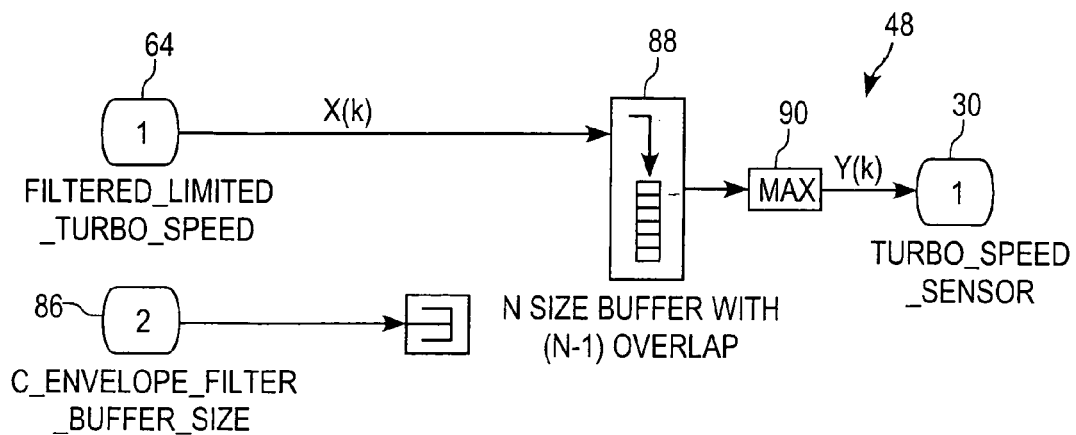
FIG. 9 is a Simulink® subsystem model of a first embodiment of the high envelope filter stage of FIG. 4 showing a buffer for receiving and storing N samples of the filtered limited turbo speed signal and a MinMax block configured to output the maximum value stored in the buffer as the turbo speed.
Figure 10:
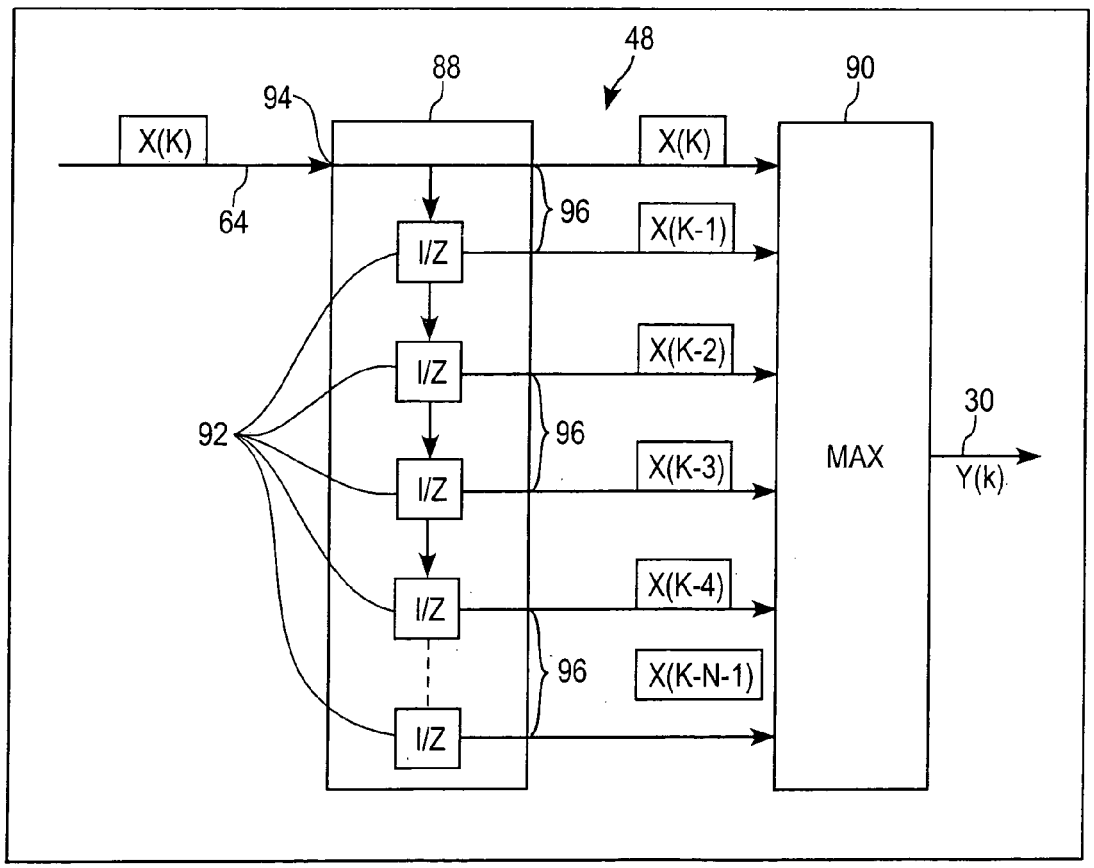
FIG. 10 is a block diagram using Simulink® block notation of the high envelope filter stage of FIG. 9.

FIG. 9 is a Simulink® model of a first embodiment of high envelope filter stage 48. High envelope filter stage 48 receives the filtered limited turbo speed signal X(k) 64 as one input and a buffer size value 88 as a second input. High envelope filter stage 48 includes an N size buffer 88 and a Max block 90. Max block 90 is a MinMax block from the nonlinear Block Library of Simulink® configured to select the maximum value of the filtered limited turbo speed currently stored in the buffer 88. Those skilled in the art will recognize that Buffer block 88 may be implemented as a subsystem block having a single input 94 for receipt of the filtered limited turbo speed signal X(k) 64, N−1 cascaded unit delay blocks 92, and N outputs 96, as shown, for example, in FIG. 10. One output 96 of buffer 88 simply passes through the input signal, i.e. filtered limited turbo speed signal X(k) 64. Each of the other outputs 96 of buffer 88 carries the output signal of one of each of the N−1 Unit Delay blocks 92, i.e. X(k−1), X(k−2) . . . X(k−(N−1)), as shown for example in FIG. 10. Thus, high envelope filter consists 48 of a moving window, its size is defined by the N number of buffer 88 with (N−1) overlap. The MinMax block is configured as a Max block so that its output Y(k) 30 always takes the maximum value output by buffer 88. The initial condition of buffer 88 is zero.

Figure 12:
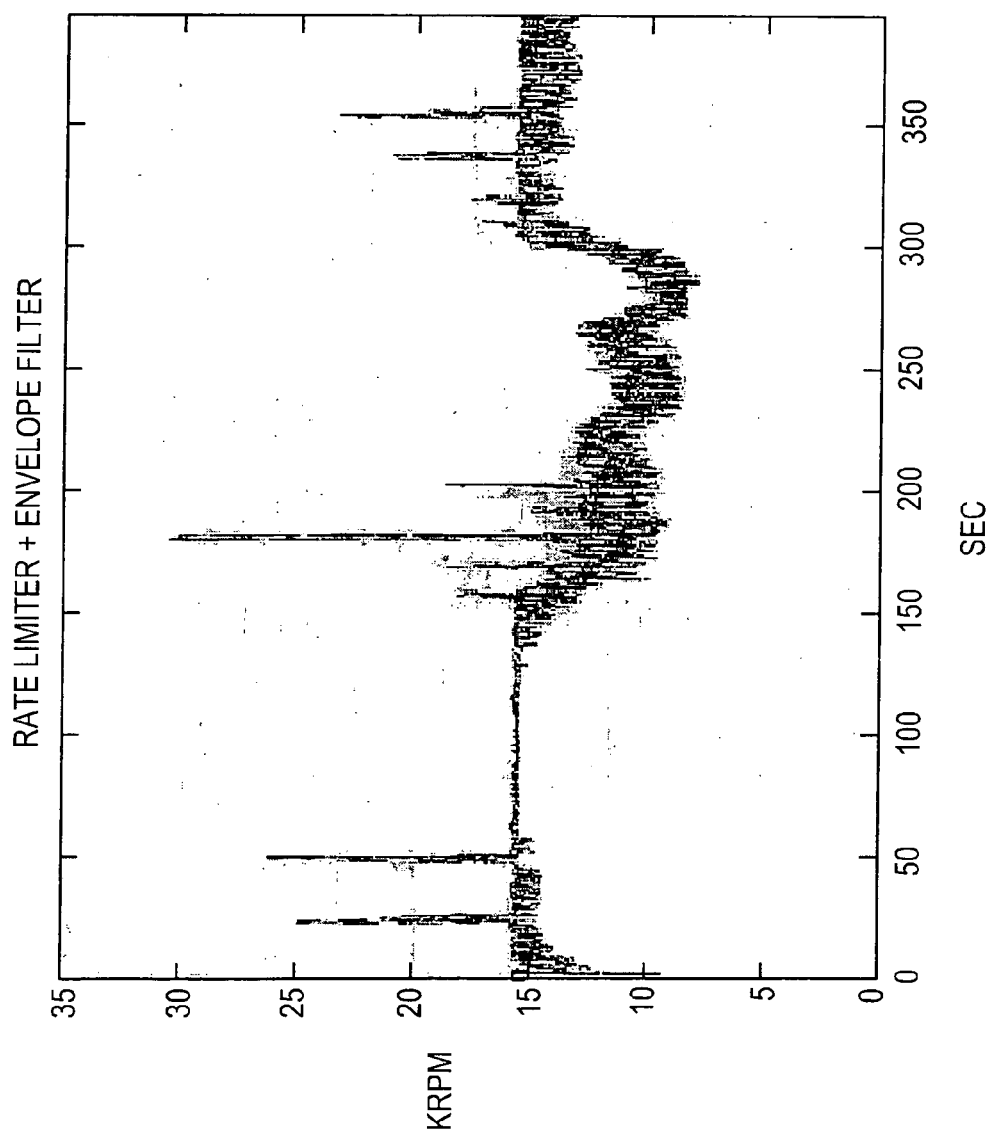
FIGS. 12 and 13 are plots of the actual turbo speeds and the turbo speed signals output by the disclosed filter.
Figure 13:
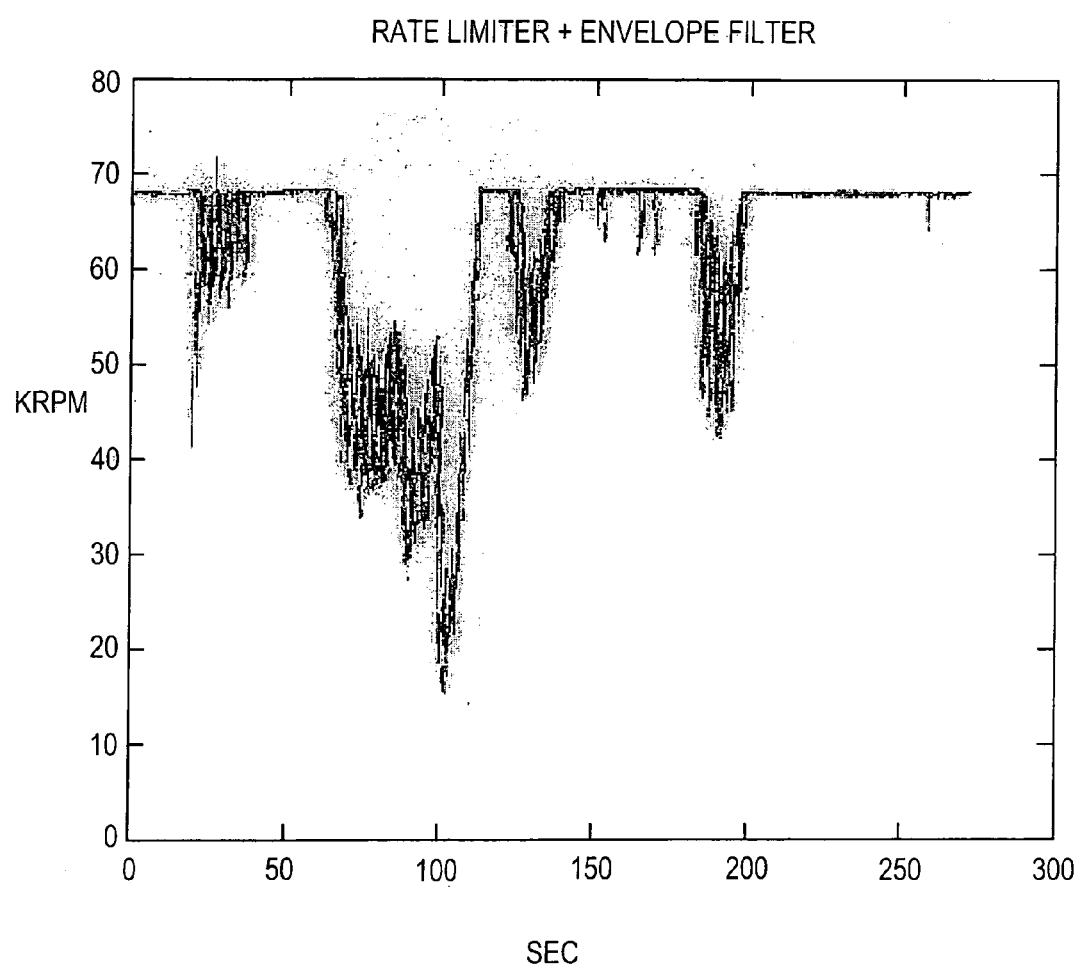

To quantify the level of noise expected, an ECHO engine was exposed to the EMI interference in the IEEE defined radio wave field where a radio antenna was about two feet away from the turbo speed sensor. The validation results are presented in FIGS. 12–13 and the data sample rate is 10 ms. The minimum sliding window size is 20, and the maximum size is 50.

Figure 11:
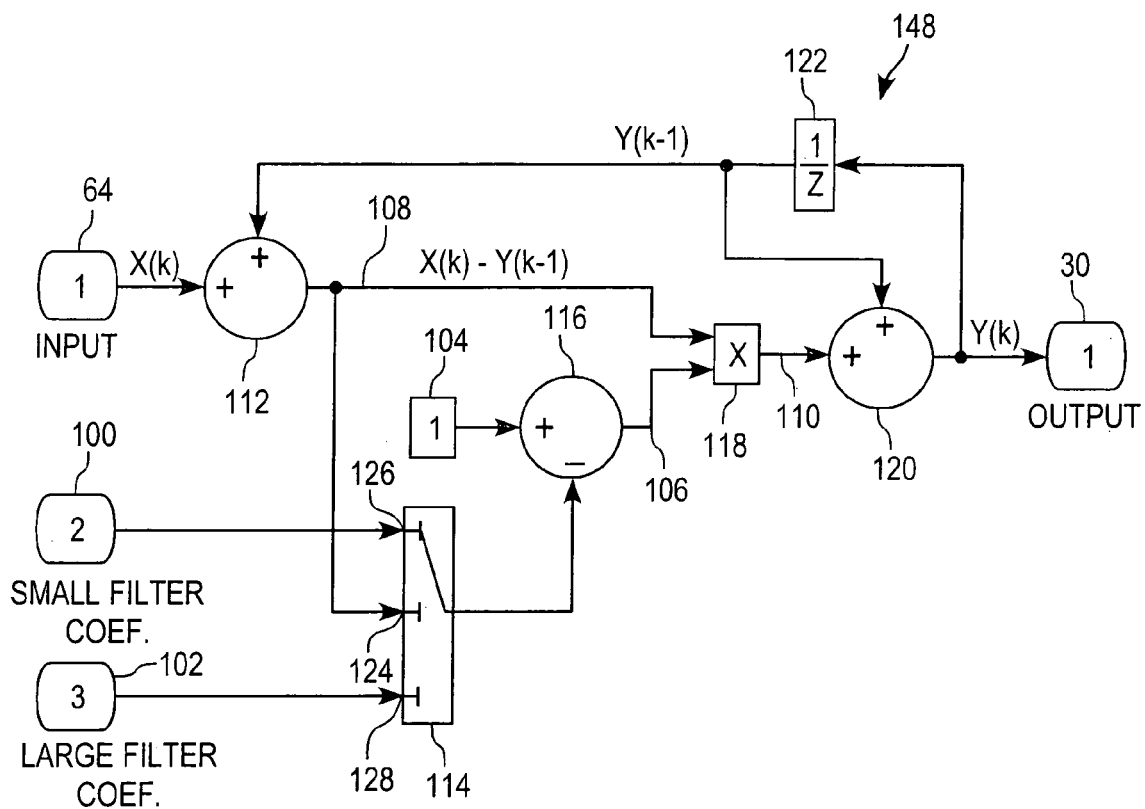
FIG. 11 is a Simulink® model of a second embodiment of the high envelope filter of FIG. 4.

An alternative high envelope filter 148 is shown in FIG. 11. High envelope filter 148 combines a first order linear filter with nonlinear envelope filter to develop a linear envelope filter 148. High envelope filter 148 has an output Y(k) 30 having a value equal to the sum of the previously output value Y(k−1) and a fraction of the difference 108 between the current input value X(k) 64 and the previously output value Y(k−1).

High envelope filter 148 has two filter coefficients: a small filter coefficient ($S_{FC}$) 100 and a large filter coefficient ($L_{FC}$) 102. Illustratively small filter coefficient ($S_{FC}$) 100 and a large filter coefficient ($L_{FC}$) 102 are selected to have values between zero and one. In implementing high envelope filter 148, the selected coefficient 100, 102 is subtracted from a constant 104, illustratively having the value one, to provide a fractional coefficient $(1−S_{FC})$ or $(1−L_{FC})$ 106. Fractional coefficient 106 is multiplied by the difference 108 of the current input X(k) 64 and previous output Y(k−1) to create a product 110 that is added to the previous output Y(k−1) to generate the filtered turbo speed signal Y(k) 30. Thus, a small filter coefficient 100 generates an output Y(k) 30 that is closer to the current input X(k)64 than a large filter coefficient 102.

When filtered limited turbo speed signal X(k) 64 is rising (indicating that the turbo speed is accelerating), small filter coefficient ($S_{FC}$) 100 is applied by high envelope filter 148. As a result, the filtered turbo speed signal Y(k) 30 output by high envelope filter 148 tracks upper edge of filtered limited turbo speed signal X(k) 64 closely as a high percentage of the difference 108 between the current filtered limited turbo speed signal X(k) 64 and the previous output Y(k−1) is added to the previous output Y(k−1). When filtered limited turbo speed signal X(k) 64 is falling (indicating that the turbo speed is decelerating), larger filter coefficient 102 is applied by high envelope filter 148. The filtered turbo speed signal Y(k) 30 output by high envelope filter 148 still tracks upper edge of filtered limited turbo speed signal X(k) 64 but with more phase shift.

In the illustrated embodiment, small filter coefficient 100 is selected to be 0.5, thus, fractional coefficient 106, when small filter coefficient 100 is selected is 50%. As a result, the filtered turbo speed signal Y(k) 30 output by high envelope filter 148 will be the previous turbo speed output Y(k−1) plus 50% of the difference 108 between the current filtered limited turbo speed signal X(k) 64 and the previous turbo speed output Y(k−1). In the illustrated embodiment, large filter coefficient 102 is selected to be 0.95, thus, the fractional coefficient 106, when large filter coefficient 102 is selected is 5%. As a result, the filtered turbo speed signal Y(k) 30 output high envelope filter 148 will be the previous turbo speed output Y(k−1) minus 5% of the difference 108 between the current filtered limited turbo speed signal X(k) 64 and the previous turbo speed output Y(k−1).

Thus, the algorithm for the asymetric first order filter 148 is:

If $$X(k)>Y(k-1)$$

$$Y(k)=Y(k-1)+(1-S_{FC})*(X(k)-Y(k-1))$$

else $$Y(k)=Y(k-1)+(1-L_{FC})*(X(k)-Y(k-1)).$$

FIG. 11 shows a Simulink® model implementing the algorithm of high envelope filter 148. The Simulink® model of high envelope filter 148 includes three inputs 64, 100, 102, a summation block 112 for finding the difference 108 between the current signal input X(k) 64 and the previous signal output Y(k−1), a Switch block 114, a constant 104, a summation block 116 to subtract the selected filter coefficient 100, 102 from constant 104, a cross product block 118, a summation block 120, a Unit delay block 122 and an output 30. The three inputs are the filtered limited turbo speed X(k) 64, small filter coefficient ($S_{FC}$) 100, and large filter coefficient ($L_{FC}$) 102. The output 30 is filtered turbo speed signal Y(k) 30. Unit delay block 112 stores the previous filtered turbo speed signal (Y(k−1) output by high envelope filter 148. Summation block 112 outputs the difference X(k)−Y(k−1) 108 between current input X(k) 64 and previous output Y(k−1) of high envelope filter 148. Difference X(k)−Y(k−1) 108 acts as a control signal to control input 124 of Switch block 114 and as an input to cross product block 118. Switch block 114 receives small filter coefficient 100 on first data input 126 and large filter coefficient 102 on second data input 128. The criteria for passing first input parameter of Switch block 114 is set so that if the difference signal 108 is positive, i.e. the turbo speed is increasing, Switch block 114 outputs the small filter coefficient 100 on first data input 126. Otherwise switch block 114 outputs the large filter coefficient 102 on second data input 128. Summation block 116 receives the output of Switch block 114 and constant 104, illustratively having the value one, as inputs. Summation block 116 is configured to output the difference of the inputs, i.e. fractional coefficient (1-selected filter coefficient) 106. Fractional coefficient (1-selected filter coefficient)106 acts as one input to cross product block 118. Difference X(k)−Y(k−1) 108 acts as a second input to cross product block 118. Cross product block 118 is configured to multiply difference 108 between the filtered rate limited turbo speed input (X(k)) and the previous turbo speed output (Y(k−1)) by fractional coefficient 106 and output the product representing the fractional change ((1-selected filter coefficient)*(X(k)−Y(k−1))) 110. Sum block 120 receives the previous filtered turbo speed signal (Y(k−1)) and fractional change ((1-selected filter coefficient)*(X(k)−Y(k−1))) 110 as inputs. Sum block 120 is configured to output the sum of these inputs as the current filtered turbo speed signal Y(k) 30, i.e. Y(k)=Y(k−1)+(1-selected filter coefficient)*(X(k)−Y(k−1)).

In the illustrated embodiments, the code generated by Simulink® from the Simulink® model is downloaded into the ECM 40 for implementation. Those skilled in the art will recognize that the ECM 40 may be programmed by code generated by other simulation software such as System Build® or the like, code generated by computational software such as MATLAB®, MatrixX® or the like or code implementing similar algorithms may be implemented using other computer languages within the scope of the disclosure. It is also within the scope of the disclosure for similar algorithms to be implemented using other controllers, or processors such as the processor of a PC, a dedicated microcontroller, a dedicated processor or the like.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A system for processing a speed signal indicative of rotational speed of a turbocharger and produced by a turbocharger speed sensor, comprising:
   a rate limiter having an input receiving the speed signal and an output producing a rate limited speed signal; and
   an envelope filter having an input receiving the rate limited speed signal and an output producing a filtered and rate limited speed signal.

2. The system of claim 1 wherein the turbocharger speed sensor is an eddy current sensor.

3. The system of claim 1 wherein the rate limiter is a rising rate limiter configured to reduce electromagnetic interference induced spikes in the speed signal.

4. The system of claim 3 wherein the rising rate limiter is configured to sample the speed signal and bound an upper value of the rate limited speed signal as a sum of a preceding speed signal sample value and a rate limit value if a difference between a current speed signal sample value and the preceding speed signal sample value exceeds a rate limit threshold.

5. The system of claim 3 wherein the rising rate limiter includes:
   a first stage rising rate limiter having an input receiving the speed signal and an output producing a first rate limited speed signal, the first stage rising rate limiter configured to sample the speed signal and bound an upper value of the first rate limited speed signal as a sum of a preceding speed signal sample value and a rate limit value if a difference between a current speed signal sample value and the preceding speed signal sample value exceeds a rate limit threshold; and a second stage rising rate limiter having an input receiving the first rate limited speed signal and an output producing a second rate limited speed signal corresponding to the rate limited signal produced by the rising rate limiter, the second stage rising rate limiter configured to sample the first rate limited speed signal and bound an upper value of the second rate limited speed signal as a sum of a preceding first rate limited speed signal sample value and the rate limit value if a difference between a current first rate limited speed signal sample value and the preceding first rate limited speed signal sample value exceeds the rate limit threshold.

6. The system of claim 1 further including a first order filter having a signal input receiving the rate limited speed signal, a filter constant input receiving a filter constant value and a signal output coupled to the input of the envelope filter, the first order filter filtering the rate limited signal and providing a resulting first order filtered and rate limited speed signal to the input of the envelope filter.

7. The system of claim 6 wherein the envelope filter is configured to envelope filter the first order filtered and rate limited speed signal and produce at the output of the envelope filter the filtered and rate limited speed signal in the form of an envelope filtered, first order filtered and rate limited speed signal.

8. The system of claim 1 wherein the envelope filter includes:
a buffer of predefined size N defining the input of the envelope filter and having as an output a moving window having a window size defined by the N size of the buffer with N−1 overlap; and
a MAX unit having an input receiving the output of the buffer and an output defining the output of the envelope filter, the MAX unit selecting as its output the maximum value of the rate limited speed signal values stored within the buffer.

9. The system of claim 1 wherein the envelope filter includes:
a first order linear filter having an input defining the input of the envelope filter and an output, the first order linear filter receiving the rate limited speed signal and producing at the output of the first order linear filter a first order filtered and rate limited speed signal; and
a non-linear envelope filter having an input receiving the first order filtered and rate limited speed signal and an output producing the filtered and rate limited speed signal in the form of a non-linear envelope filtered, first order filtered and rate limited speed signal.

10. The system of claim 9 wherein the envelope filter is configured to sample the rate limited speed signal and to compute a difference value as a difference between a current rate limited speed signal sample value and a previous filtered and rate limited speed signal value produced by the envelope filter, the envelope filter producing as a current value of the filtered and rate limited speed signal a sum of the previous filtered and rate limited speed signal value and a product of the difference value and a small filter value if the current rate limited speed signal sample value is greater than the previous filtered and rate limited speed signal value, and to otherwise produce as the current value of the filtered and rate limited speed signal a sum of the previous filtered and rate limited speed signal value and a product of the difference value and a large filter value.

11. The system of claim 10 wherein the envelope filter is further configured to compute the small filter value as a difference between one and a fractional small filter coefficient value, and to compute the large filter value as a difference between one and a fractional large filter coefficient value.

12. The system of claim 1 further including:
a swallowing capacity control mechanism responsive to a control signal to vary a swallowing capacity of the turbocharger; and
a controller producing the control signal as a function of the filtered and rate limited speed signal and a target speed value.

13. A method of processing a speed signal indicative of rotational speed of a turbocharger and produced by a turbocharger speed sensor, the method comprising the steps of:
rate limiting the speed signal to produce a rate limited speed signal; and
envelope filtering the rate limited speed signal to produce an envelope filtered and rate limited speed signal.

14. The method of claim 13 wherein the step of rate limiting the speed signal includes:
sampling the speed signal; and
bounding an upper value of the rate limited speed signal as a sum of a preceding speed signal sample value and a rate limit value if a difference between a current speed signal sample value and the preceding speed signal sample value exceeds a rate limit threshold.

15. The method of claim 13 further including the step of first order filtering the rate limited signal prior to the step of envelope filtering the rate limited speed signal.

16. The method of claim 13 wherein the step of envelope filtering the rate limited speed signal includes:
buffering the rate limited speed signal with an N-size buffer with N−1 overlap; and
selecting as the envelope filtered and rate limited signal a maximum value of the rate limited speed signal values contained within the buffer.

17. The method of claim 13 wherein the step of envelope filtering the rate limited speed signal includes:
sampling the rate limited speed signal;
computing a difference value as a difference between a current rate limited speed signal sample value and a previous filtered and rate limited speed signal value produced by the envelope filter; and
producing as a current value of the filtered and rate limited speed signal a sum of the previous filtered and rate limited speed signal value and a product of the difference value and a small filter value if the current rate limited speed signal sample value is greater than the previous filtered and rate limited speed signal value, and otherwise producing as the current value of the filtered and rate limited speed signal a sum of the previous filtered and rate limited speed signal value and a product of the difference value and a large filter value.

18. The method of claim 17 wherein the step of envelope filtering the rate limited speed signal further includes:
computing the small filter value as a difference between one and a fractional small filter coefficient value; and
computing the large filter value as a difference between one and a fractional large filter coefficient value.

19. The method of claim 16 further including the steps of:
producing an error signal based on a comparison of the envelope filtered and rate limited speed signal with a target turbocharger speed value; and
controlling a swallowing capacity of the turbocharger as a function of the error signal.

* * * * *

UNITED STATES PATENT AND TRADEMARK OFFICE
CERTIFICATE OF CORRECTION

| | |
|---|---|
| PATENT NO. | : 7,069,171 B2 |
| APPLICATION NO. | : 10/616262 |
| DATED | : June 27, 2006 |
| INVENTOR(S) | : Wang et al. |

It is certified that error appears in the above-identified patent and that said Letters Patent is hereby corrected as shown below:

Column 12, line 60, "16" should be changed to --13--.

Signed and Sealed this

Fifth Day of June, 2007

JON W. DUDAS
*Director of the United States Patent and Trademark Office*